United States Patent [19]

Van Megen et al.

[11] 4,337,535

[45] Jun. 29, 1982

[54] DEVICE FOR PREVENTING UNWANTED REFLECTIONS FROM AN OPTICAL SYSTEM TO A LASER IN AN APPARATUS FOR OPTICALLY READING A RECORD CARRIER

[75] Inventors: Everardus A. Van Megen; Carel A. Simons; Eduard W. Moen, all of Eindhoven, Netherlands

[73] Assignee: U.S. Philips Corporation, New York, N.Y.

[21] Appl. No.: 12,099

[22] Filed: Feb. 14, 1979

Related U.S. Application Data

[63] Continuation of Ser. No. 804,887, Jun. 9, 1977, abandoned, which is a continuation of Ser. No. 625,182, Oct. 23, 1975, abandoned.

[30] Foreign Application Priority Data

Jun. 2, 1975 [NL] Netherlands .......................... 7506495

[51] Int. Cl.³ .......................... G11B 7/00; G11B 7/12
[52] U.S. Cl. .................................. 369/121; 369/109; 369/110; 369/111
[58] Field of Search ................. 179/100.3 V, 100.1 G, 179/100.3 G; 358/127-132; 365/120, 124; 369/109-112, 121-122

[56] References Cited

U.S. PATENT DOCUMENTS

| | | | |
|---|---|---|---|
| 3,534,166 | 10/1970 | Korpel | 179/100.3 V |
| 3,829,622 | 8/1974 | Elliot | 179/100.3 V |
| 3,919,698 | 11/1975 | Bricot | 179/100.3 V |
| 3,969,573 | 7/1976 | Bouwhuis | 179/100.3 V |
| 3,969,576 | 7/1976 | Boonstra et al. | 179/100.3 V |
| 3,983,317 | 9/1976 | Glorioso | 179/100.3 V |

Primary Examiner—Raymond F. Cardillo, Jr.
Attorney, Agent, or Firm—Thomas A. Briody; Robert T. Mayer; Algy Tamoshunas

[57] ABSTRACT

An apparatus is described for reading a record carrier on which information is stored in an optically readable information structure, which apparatus includes a radiation source which supplies a read beam of great coherence length. By including a radiation attenuating element in the radiation path of the read beam, preferably nearest to the radiation source, random intensity modulations in the read beam, which modulations may be caused by undesired reflections in the radiation path, can be substantially reduced.

4 Claims, 1 Drawing Figure

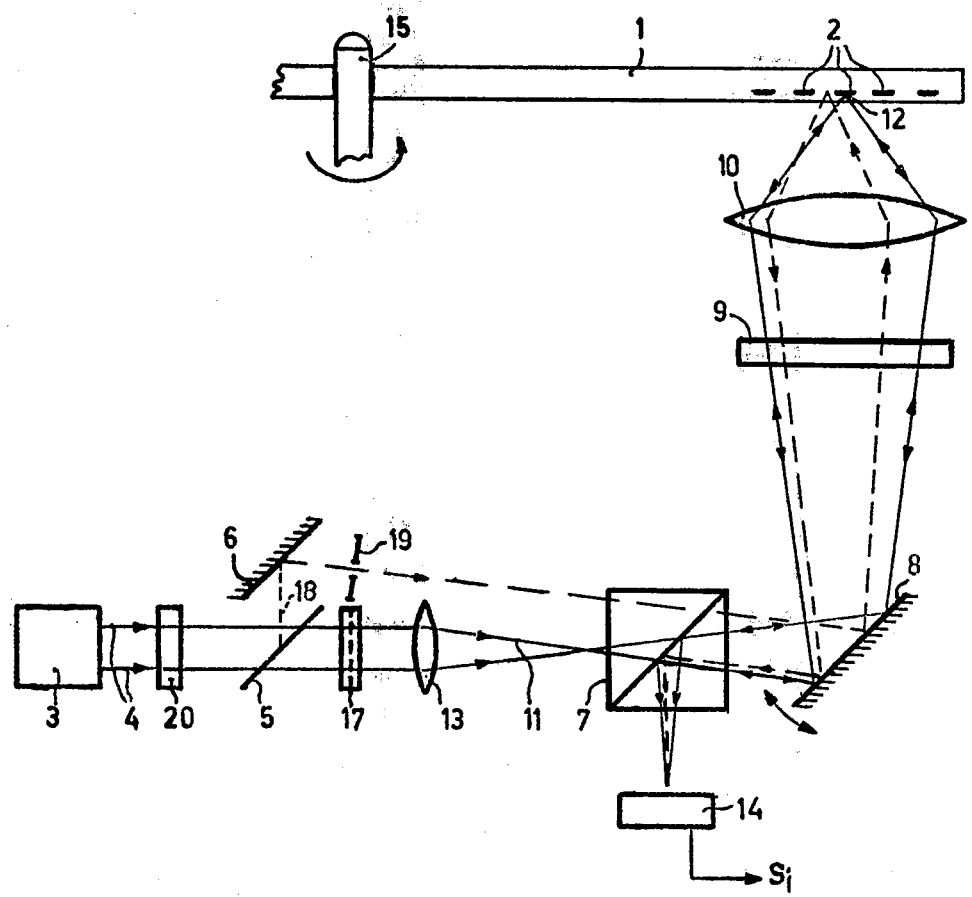

DEVICE FOR PREVENTING UNWANTED REFLECTIONS FROM AN OPTICAL SYSTEM TO A LASER IN AN APPARATUS FOR OPTICALLY READING A RECORD CARRIER

This is a continuation of Ser. No. 804,887 filed on June 9, 1977, now abandoned, which in turn is a continuation of Ser. No. 625,182 filed Oct. 23, 1975, now abandoned.

The invention relates to an apparatus for reading a record carrier on which information, for example video and/or audio information, is stored in an optically readable information structure, which apparatus comprises a radiation source which supplies a coherent read beam, and an objective system for passing the read beam via the record carrier to a radiation-sensitive detection system.

Such an apparatus is known, inter alia from Philips Technical Review 33, No. 7, pages 186–189. In the known apparatus, for reading a reflecting record carrier, the radiation source is a laser which emits linearly polarized radiation. Said radiation is completely transmitted to the record carrier by a beam splitter which is a polarization separator. Between the beam splitter and the record carrier a λ/4 plate is disposed in a diagonal position, which plate is once traversed by the beam directed toward the record and once by the modulated read beam. In the ideal situation, the direction of polarization of the modulated read beam is consequently rotated through 90° relative to that of the read beam from the laser, so that the modulated read beam is reflected by the beam splitter. Thus, in the ideal case an undesired feedback of the modulated radiation to the laser is avoided, which feedback would cause undesired fluctuations in the output power of the laser.

When reading the record carrier care must be taken that the read beam remains sharply focussed on the information structure and that said beam remains correctly centered on a track to be read. For this purpose, the read apparatus is provided with for example an optoelectronic focussing detection system which supplies a signal which is a measure of a deviation between the desired and the actual plane of focussing of the read beam, which signal is applied to a control system for focussing correction. The read apparatus is furthermore provided with an opto-electronic centering detection system, which supplies a signal which is a measure of the centering of the read beam relative to an information track to be read, and which signal is supplied to a control system for correcting the centering.

The systems for maintaining the focussing and the centering constant are found to be highly susceptible to so-called "optical noise" which may arise in the read apparatus. The frequencies of the optical noise namely approximate the frequencies of the focussing detection and the centering detection signals. The causes of the optical noise are the following.

The distance over which the laser radiation is constant is fairly large. Despite the presence of the polarization separator and the λ/4 plate there may be some feedback of radiation to the laser. The assembly of the λ/4 plate and the polarization separator namely exhibits the ideal operation described above only for a parallel beam of radiation which is incident perpendicular to said elements. The read beam from the laser, however, is a divergent beam at the location of said elements and the modulated read beam is a converging beam, so that there is also radiation which is incident on the polarization separator and the λ/4 plate at an acute angle. Moreover, the record carrier, which moves relative to the read beam, may cause variations in the position of the plane of polarization of the read beam. Owing to the read beam being out-of-parallel and owing to the additional rotations of the plane of polarization the assembly of the polarization separator and the λ/4 plate cannot entirely prevent feedback of radiation to the laser. Furthermore, it is also possible that radiation is reflected to the laser by optical elements which are disposed in the radiation path before the polarization separator, or by the last-mentioned element itself.

Finally, a cause of optical noise may be attributed to the fact that the reflecting surface of the record carrier, the outer surface of the exit mirror of the laser, and the surfaces of the optical elements in the radiation path, which surfaces always exhibit some reflection, may constitute resonant cavities. Radiation beams produced by successive reflections at these surfaces may interfere with each other. When the read apparatus is in operation, said surfaces may exhibit a movement in the direction of the optical axis of the read-beam. Absolutely speaking, the movements are very small, but relative to the wavelength of the radiation used for reading they are fairly great. Owing to said movements variations arise in the lengths of the resonant cavities, which variations give rise to random intensity modulations in the read beam.

The presence of a λ/4 plate in a resonant cavity results in radiation beams which are reflected an even number of times at the surfaces of the resonant cavity having a direction of polarization which is rotated through 90° relative to the direction of polarization of the beams which have been reflected an odd number of times at the surfaces of the resonant cavities. As a result, elliptically polarised radiation is obtained whose intensity variations are smaller than the variations which would arise if no λ/4 plate were present in the radiation path. It is true that the λ/4 plate may lead to a reduction of random modulations in the read beam intensity, but said reduction often appears to be too small in practice.

Moreover, the read apparatus may comprise resonant cavities in which no λ/4 plate is present.

The object of the present invention is to reduce the optical noise in an apparatus for optically reading a record carrier by simple means, in such a way that its influence on the systems for stabilising the centring and focussing is negligible. The apparatus according to the invention is therefore characterized in that the radiation path between the radiation source and the objective system includes a radiation-attenuating element.

The radiation attenuating element is arranged so that it is traversed only once by the radiation which is received by the detection system. The intensity of said radiation is inversely proportional to the attenuation factor of the radiation-attenuating element. The radiation which is reflected to the laser traverses the radiation attenuator twice or, in the event of more reflections, several times, so that the intensity of said radiation is inversely proportional to at least the square of the attenuation factor.

It is to be noted that from German patent application No. 2,413,423, which has been laid open for public inspection, an optical read apparatus is known in which a λ/4 plate is disposed in the light path, which plate serves to reduce random intensity modulations of the laser beam owing to movements of the record carrier in the direction of the optical axis. Said λ/4 plate reduces the intensity modulations in the same way as the λ/4 plate in the present apparatus, which last-mentioned λ/4 plate is first of all provided to separate a modulated read beam from the radiation coming from the record carrier. The λ/4 plate in the apparatus in accordance with the German patent application thus has a different function than the radiation attenuating element according to the invention.

In an apparatus for optically reading a reflecting record carrier a modulated read beam can also be separated with a semi-transparent mirror instead of a polarisation separator and a λ/4 plate. As a result, the read apparatus can be simplified and made cheaper. However, in that case more radiation is reflected towards the laser and more optical noise will be produced. According to the invention it is also possible to include a radiation-attenuating element in a read apparatus provided with a semi-transparent mirror in order to reduce the optical noise.

So far, a radiation-reflecting record carrier has been considered. However, a record carrier may also be radiation-transmitting. Undesired reflections at the optical elements in the radiation path or the record carrier may also occur in an apparatus for reading a radiation-transmitting record carrier. Optical noise owing to the reflections at the optical elements may effectively be prevented by arranging said elements obliquely relative to the chief ray of the read beam. In that case only an undesired reflection at the record carrier, which is perpendicular to the chief ray of the read beam, may then cause optical noise. This optical noise can again be reduced by including a radiation-attenuating element in the radiation path, in accordance with the invention.

The attenuation factor of the radiation attenuating element, which equals the quotient of the radiation intensity which is incident on the element and the radiation intensity transmitted by the element, may be different values depending on the type of read apparatus, for example from 1.2 to 10. The higher values are selected for a read apparatus with a semi-transparent mirror.

The radiation attenuating element is preferably arranged nearest the laser, i.e. before all optical elements at which radiation may be reflected. In a preferred embodiment the radiation attenuating element is disposed on the substrate of the exit mirror on the laser.

The radiation attenuating element may take different forms. For example, said element may be an absorption filter, an assembly of two linear polarizers whose chief directions make an acute angle with each other, or a reflection filter on which the read beam is not incident perpendicularly.

The invention will now be described with reference to the FIGURE, which by way of example shows an embodiment of an apparatus according to the invention for reading a radiation-reflecting record carrier.

In this FIGURE the reference numeral 1 refers to a round disk-shaped record carrier, which is provided with information tracks 2, shown in cross-section. The record carrier is illuminated with radiation from a laser 3. By means of the objective 10 the read beam 11 is focussed on the plane of the information tracks to a small radiation spot 12 of the order of magnitude of the information details in the information structure. The auxiliary lens 13 ensures that the pupil of the objective is filled. The read beam is reflected by the information structure and traverses the objective 10 for a second time.

The path of the read beam includes a polarisation-separating prism 7 and a λ/4 plate 9. The laser emits linearly polarised radiation which is transmitted by the dividing prism 7. The λ/4 plate is traversed once by the onward road beam and once by the modulated read beam, so that the direction of polarisation of the last-mentioned beam is rotated through 90° relative to the direction of polarisation of the beam which emerges from the laser. The modulated read beam is then reflected by the polarisation separating dividing prism to a radiation-sensitive detection system 14. When the record carrier is rotated around a central axis 15 and electrical signal $S_i$ is obtained at the output of the detection system, which signal is time modulated in accordance with the information stored in a track to be read on which the read spot is centred. In the case that a color television program is stored on the record carrier, the signal $S_i$ may be decoded and reproduced on a television reproducing apparatus.

Various methods of detecting errors in the centring of the read spot relative to a track to be read have been proposed. FIG. 1, by way of example, shows one of the possibilities. The path of the read beam includes a phase grating 17 which divides the read beam into a zero-order beam, which is employed for reading the information on the record carrier, and two first-order beams, not shown. The objective focusses the two first-order beams to two auxiliary radiation spots in opposite direction which are offset by half a trackwidth relative to the read spot. In the detection system a separate detector is provided for each of the auxiliary radiation spots. By comparing the signals supplied by the detectors conjugated with the auxiliary radiation spots, an indication can be obtained of the magnitude and the direction of a centring error of the read spot relative to a track to be read. The centering can then be corrected, for example by rotation of the mirror 8.

Furthermore, FIG. 1 illustrates one of the possibilities of detecting errors in the focussing of the read beam on the plane of the information structure. With the aid of a dividing mirror 5, an auxiliary beam 18, of which only the chief ray is represented by a dashed line, can be separated from the beam 4 supplied by the laser. The auxiliary beam is directed by the mirror 6 through a diaphragm 19 having a narrow opening. The narrow auxiliary beam (or focussing beam) 18 traverses the objective skew, is reflected by the record carrier, and then traverses the objective skew again. The focussing beam is subsequently reflected by the dividing prism 7 to the radiation-sensitive detection system 14, which system includes two additional detectors for the focussing beam. The distance to the optical axis of the objective, at which the focussing beam enters the objective after reflection at the record carrier, and thus the degree of refraction of the focussing beam and hence the position of said beam relative to the focussing detectors, is determined by the degree of focussing of said beam and of the read beam on the information structure. By comparing the signals supplied by the focussing detectors an indication can be obtained of the magnitude and the direction of a possible focussing error. With the aid of said information the focussing can be corrected, for example, by moving the objective in an axial direction with the aid of an electromagnetic coil.

In the apparatus described so far, spurious signals may be superimposed on the signals supplied by the centering detectors and the focussing detectors. As outlined in the introduction to this description, the spurious signals may arise owing to feedback of radiation to the laser source and owing to interference of radiation beams which have been reflected several times at the record carrier, at the outer surface of the exit mirror of the laser, and at surfaces of the optical elements in the radiation path.

In order to reduce the spurious signals a radiation sensitive element 20 may be included, according to the invention, in the radiation path before the dividing prism 7, for example before the dividing mirror 5. The radiation received by the detection system has traversed said element once. Radiation which after reflection at the record carrier or at the faces of the optical elements is transmitted by the dividing prism instead of being reflected, traverses the radiation-attenuating element at least two times, in the case of multiple reflections of the exit surface of the laser, at the record carrier or at said faces several times. The intensity of said undesired reflections will be proportional to at least the square of the attenuation factor of the radiation-attenuating element. A radiation beam received by the detection system 14 will also be attenuated, but to a substantially smaller extent than the undesired reflections because said beam traverses the element 20 only once. In practice it has been found that the attenuation factor may be selected so that the influence of the above-mentioned spurious signals on the control systems, for centering and for focussing is negligible, while yet sufficient radiation intensity is available in the read beam and in the auxiliary beams for centering and for focussing.

The radiation attenuating element 20 may be an absorption filter. In a realized embodiment said filter has an attenuation factor of 2.

In the case where the radiation source emits linearly polarized radiation, the absorption-filter may be replaced by a linear polarizer. The angle between the direction of polarization of the polarizer and that of the radiation determines the attenuation factor. It is alternatively possible to arrange two linear polarizers spaced from each other along the radiation path. Then, the radiation source need not emit linearly polarized radiation. The attenuation factor of the assembly of the two polarizers is then determined by the angle between the directions of polarization of said polarizers.

The radiation-attenuating element may also be constituted by a reflection filter, i.e. a filter which partly transmits and partly reflects an incident beam of radiation. Said reflection filter should then be disposed so that the chief ray of the radiation beam is not incident perpendicular to the filter.

The radiation attenuating element may be disposed anywhere in the light path between the laser and the beam separator 7, providing that said element is traversed by the read beam and the centering and focussing auxiliary beams.

The present invention may be used in all devices for optically reading a radiation-reflecting or radiation-transmitting record carrier, which are provided with opto-electronic systems for focussing and centering correction. For the invention it is irrespective how the centering and focussing errors are detected. Neither is it important for the invention what type of information is stored on the record carrier. The information may be a (color) television program but also may be digital information.

What is claimed is:

1. An apparatus for reading information stored on a record carrier in an optically readable information structure, said apparatus comprising means for producing a coherent beam of radiation having an intensity sufficient to read the information stored in the information structure without causing physical changes in said information structure, means for directing said beam toward said record carrier along a first path, means for focussing said beam to a spot on said information structure to thereby modulate at least a portion of said beam in accordance with the information stored in said information structure, said modulated portion of said beam passing from said record carrier along a second path at least a portion of which is separate and distinct from said first path, a radiation sensitive detector arranged along said separate portion of said second path to intercept said modulated portion of said beam and means for attenuating the intensity of said beam, said attenuating means being positioned along a portion of said first path, which is separate and distinct from said portion of said second path, so as to intercept substantially the entire cross-sectional area of of said beam passing from said beam producing means toward said record carrier and radiation reflected back toward said beam producing means and attenuate the intensity of both the beam passing from said beam producing means toward said carrier and said reflected radiation to thereby reduce optical noise caused by said reflected radiation.

2. The apparatus according to claim 1 or 2 wherein said information structure is radiation reflecting so that said modulated portion of said beam is reflected from said record carrier along said first path and including means disposed at a position along said first path for separating said modulated portion of said beam from the radiation beam passing from said beam producing means to said record carrier and directing said modulated portion of said beam along said separate portion of said second path.

3. The apparatus according to claim 2 wherein said beam producing means includes a laser having an exit mirror for transmitting said beam and said radiation absorbing element is disposed on said exit miror.

4. The apparatus according to claim 1 wherein said attenuating means includes a reflection filter disposed at an acute angle with the central axis of said beam passing from said beam producing means to said record.

* * * * *